J. CRAMER.
CULTIVATOR CLEVIS.
APPLICATION FILED FEB. 16, 1918.
1,303,034.
Patented May 6, 1919.
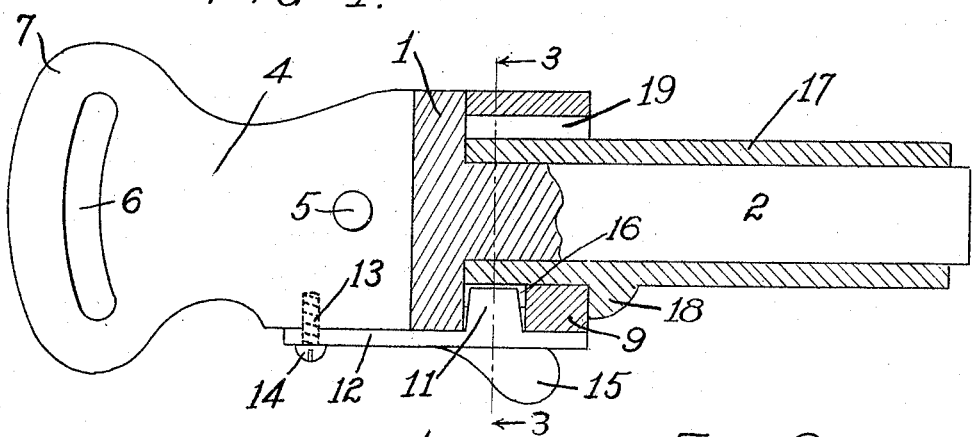
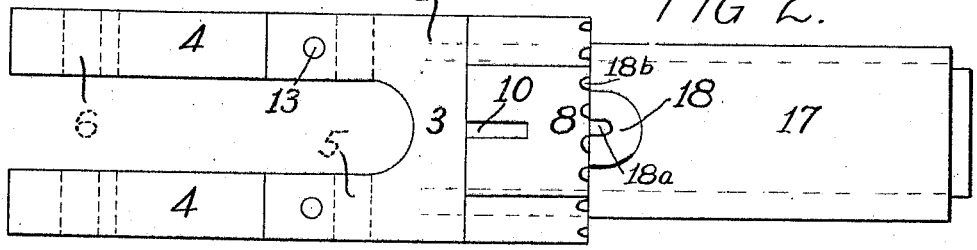
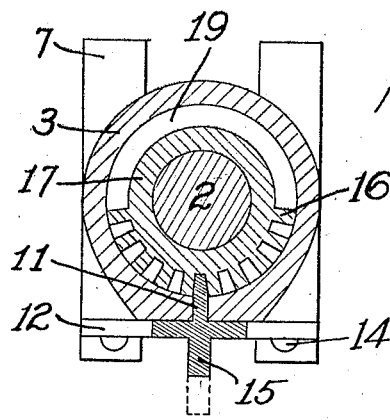
John Cramer
INVENTOR.

UNITED STATES PATENT OFFICE.

JOHN CRAMER, OF TORONTO, KANSAS.

CULTIVATOR-CLEVIS.

1,303,034.  Specification of Letters Patent.  Patented May 6, 1919.

Application filed February 16, 1918. Serial No. 217,548.

*To all whom it may concern:*

Be it known that I, JOHN CRAMER, a citizen of the United States, and resident of Toronto, in the county of Woodson and State of Kansas, have invented certain new and useful Improvements in Cultivator-Clevises; and I do declare the following to be a full, clear, and exact description of the same, reference being had to the accompanying drawings, forming a part of this specification.

This invention relates to a cultivator and more especially to that type of cultivator wherein the operative element of the cultivator is adjustable both angularly about a pivot and angularly about an axis. The essential object of this invention is the provision of a machine of this type which is simple and efficient and at the same time of such construction that it may be made at a reasonable price.

With the above object in view, the invention consists in certain combinations, arrangements, and constructions of parts hereinafter described in a preferred form, and particularly pointed out in the claims at the end of the specification.

In the drawings:

Figure 1 is a central vertical view partly in section, of the device, with the spring and part of the cylindrical extension in sectional elevation;

Fig. 2 is a bottom plan view with the spring omitted; and

Fig. 3 is a vertical section taken on the line 3—3 of Fig. 1.

Like characters of reference in the several figures indicate the same parts.

The machine adopted for illustrating the invention is one in which the cultivator clevis is pivoted on the main member and adapted to be bolted in the desired angular adjustment with respect to the central rod and the clevis with the main member then adjusted angularly about the axis of a second member, whereby the vertical and the horizontal angles made with the earth by the axis of the cultivator element may be varied at will.

Referring to Fig. 1 of the drawings, 1 is a support for the cultivator clevis and consists of a cylindrical extension 2, projecting from the main section 3 on one side, and two arms 4, 4, forming a bifurcated section to accommodate the cultivator clevis not shown.

The clevis is pivoted to the arms 4, 4, as at 5, 5, and is held in the desired adjusted position by a bolt passed through the arcuate slots 6, 6, in the curved ends 7, 7, of the arms 4, 4, which are curved as shown by Fig. 1, in order to be as light as is consistent with the strength required.

Rigidly secured, in any preferred way, to the main section 3 is a shank 8, generally tubular in shape but having a thickened portion 9 at the lower end, to the front. Just behind this thickened portion 9, is a slot 10, adapted to receive a retaining finger 11 of a plate spring 12, which is fastened to the support 1, as at 13, by means of screws 14, or other suitable fastening means as may be desired.

The spring 12 is bifurcated at the rear end to fit the arms 4, 4, and is provided with a handle 15, whereby the finger 11 may be partially withdrawn from the slot 10 to release the teeth 16 of the boxing 17 which fits snugly over the cylindrical extension 2 of the support 1.

A stop lug 18 is provided on the boxing 17 to limit the inward movement of that element on the extension 2. The lug 18 may, if preferred, be made of small width, such as 18ª and may then be used to denote the exact position at which the teeth are so placed that the finger 11 may be inserted. I have found it preferable, however, to make a mark on the lug 18 to denote such position when used in connection with the cut-away portions 18ᵇ on the front edge of the support 1, such cut-away portions denoting the position of the teeth and the flush portions between them, denoting the spaces between the teeth.

The boxing 17 is placed in position on the extension 2 with the teeth 16 uppermost, in which position they will clear the thickened portion 9, being received within the space 19 indicated in Fig. 1. The boxing is then turned one hundred and eighty degrees on the rod 2 with the finger 11 of spring 12 held elevated, and the teeth are then held against longitudinal movement by the stop lug 18 and the thickened portion 9.

Rotative movement is then prevented by allowing the finger 11 to engage between two of the teeth 16 whereby the support 1 and the boxing 17 are securely locked together.

I claim:

1. In a device of the character described, the combination with a support adapted to pivotally receive a cultivator clevis, of a boxing, slidable on said support, and means for locking said support and boxing.

2. In a device of the character described, the combination with a support adapted to pivotally receive a cultivator clevis, and having a cylindrical portion, of a boxing slidable on said cylindrical portion, and means for locking said support and said boxing.

3. In a device of the character described, the combination with a support adapted to pivotally receive a cultivator clevis, and having a cylindrical portion, of a boxing slidable on said cylindrical portion, teeth on said boxing, and a spring mounted on said support having a finger adapted to be received between two of said teeth in order to lock said support and said boxing.

4. In a device of the character described, the combination with a support adapted to pivotally receive a cultivator clevis, having a cylindrical portion, of a boxing slidable on said portion, teeth on said boxing, and a spring mounted on said support and having a finger adapted to be received between two of said teeth, and means indicating the positions in which the finger may be received between the teeth.

JOHN CRAMER.

Copies of this patent may be obtained for five cents each, by addressing the "Commissioner of Patents, Washington, D. C."